United States Patent [19]
Alcorn

[11] Patent Number: 5,719,600
[45] Date of Patent: Feb. 17, 1998

[54] GRADIENT CALCULATION SYSTEM AND METHOD

[75] Inventor: Byron A. Alcorn, Fort Collins, Colo.

[73] Assignee: Hewlett-Packard Company, Palo Alto, Calif.

[21] Appl. No.: 571,013

[22] Filed: Dec. 12, 1995

[51] Int. Cl.$^6$ ................................................ G09B 9/08
[52] U.S. Cl. ................................................ 345/430
[58] Field of Search ................................ 395/125, 126, 395/127, 128, 129, 130, 131, 136

[56] References Cited

U.S. PATENT DOCUMENTS

| | | | |
|---|---|---|---|
| 5,222,204 | 6/1993 | Swanson | 395/127 |
| 5,222,205 | 6/1993 | Larson et al. | 395/130 |
| 5,224,208 | 6/1993 | Miller, Jr. et al. | 395/130 X |
| 5,278,949 | 1/1994 | Thayer | 395/126 |
| 5,369,736 | 11/1994 | Kato | 395/130 X |

*Primary Examiner*—Phu K. Nguyen
*Assistant Examiner*—Cliff N. Vo

[57] ABSTRACT

A gradient calculation system and method are described for use in a texture mapping system for calculating a gradient for each pixel defining a primitive of an image from a plane equation that describes the primitive. The primitive represented by the plane equation is decomposed into spans by an edge stepper, which steps the edges of the primitive, calculating the parameter values (e.g., S,T coordinates and perspective correction factor W) of the starting pixel for each span. A span stepper takes the starting parameter values generated by the edge stepper and interpolates parameter values for pixels along each span. The parameter values for each pixel are then passed to a gradient and perspective correction mechanism which calculates a gradient for each pixel by determining the difference between the parameter values for the current pixel and the parameter values of the next pixel in the x direction to derive $\Delta Px$ and the adjacent pixel in the y direction to derive $\Delta Py$, and then taking the maximum differences as the gradient. In addition, perspective correction is performed by first modifying the primitive data defining the primitive with a perspective correction factor W prior to calculating the plane equation and then removing the perspective correction factor W at the gradient and perspective corrective mechanism prior to calculating the gradient.

18 Claims, 10 Drawing Sheets

GRADIENT CALCULATION SYSTEM AND METHOD

FIELD OF THE INVENTION

The present invention relates generally to texture mapping in a computer graphics system and, more particularly, to a system and method for calculating parameter gradients via plane equations.

BACKGROUND OF THE INVENTION

Computer graphics systems commonly are used for displaying graphical representations of objects on a two dimensional display screen. Current computer graphics systems can provide highly detailed representations and are used in a variety of applications.

In typical computer graphics systems, an object to be represented on the display screen is broken down into a plurality of graphics primitives. Primitives are basic components of a graphics picture and may include points, lines, vectors and polygons, such as triangles. Typically, a hardware/software scheme is implemented to render, or draw, on the two-dimensional display screen, the graphics primitives that represent the view of one or more objects being represented on the screen.

The primitives that define the three-dimensional object to be rendered are provided from a host computer, which defines each primitive in terms of primitive data. For example, when the primitive is a triangle, the host computer may define the primitive in terms of the x,y,z coordinates of its vertices, as well as the R,G,B (red, green, blue) color values of each vertex. Rendering hardware interpolates the primitive data to compute the display screen pixels that are turned on to represent each primitive and the R,G,B values for each pixel.

Early graphics systems failed to display images in a sufficiently realistic manner to represent or model complex three-dimensional objects. The images displayed by such systems exhibited extremely smooth surfaces, absent textures, bumps, scratches, shadows and other surface details present in the object being modeled.

As a result, methods were developed to display images with improved surface detail. Texture mapping is one such method that involves mapping a source image, referred to as a texture, onto a surface of a three-dimensional object, and thereafter mapping the textured three-dimensional object to the two-dimensional graphics display screen to display the resulting image. Surface detail attributes that are commonly texture mapped include color, specular reflection, normal perturbation, transparency, shadows, surface irregularities, and grading.

Texture mapping involves applying one or more point elements, or texels, of a texture to each point, or element pixel, of the displayed portion of the object to which the texture is being mapped. Texture mapping hardware is conventionally provided with information indicating the manner in which the texels in a texture map correspond to the pixels on the display screen that represent the object. Each texel in a texture map is defined by S and T coordinates which identify its location in the two-dimensional texture map. For each pixel, the corresponding texel or texels that map to the pixel are accessed from the texture map via the S and T coordinates associated with that pixel and are incorporated into the final R,G,B values generated for the pixel to represent the textured object on the display screen.

It should be understood that each pixel in an object primitive may not map in a one-to-one correspondence with a single texel in the texture map for every view of the object. For example, the closer the object is to the view port represented on the display screen, the larger the object will appear. As the object appears larger on the display screen, the representation of the texture becomes more detailed. Thus, when the object consumes a fairly large portion of the display screen, a large number of pixels is used to represent the object on the display screen, and each pixel that represents the object may map in a one-to-one correspondence with a single texel in the texture map, or a single texel may map to multiple pixels. However, when the object takes up a relatively small portion of the display screen, a much smaller number of pixels is used to represent the object, resulting in the texture being represented with less detail, so that each pixel may map to multiple texels. Each pixel may also map to multiple texels when a texture is mapped to a small portion of an object. Resultant texel data is calculated for each pixel that maps to more than one texel and typically represents an average of the texels that map to that pixel.

Texture mapping hardware systems typically include a local memory that stores data representing a texture associated with the object being rendered. As discussed above, a pixel may map to multiple texels. If it were necessary for the texture mapping hardware to read a large number of texels that map to a pixel from the local memory to generate an average value, then a large number of memory reads and the averaging of many texel values would be required, which would be time consuming and would degrade system performance.

To overcome this problem, a scheme has been developed that involves the creation of a series of MIP (multum in parvo, or many things in a small place) maps for each texture, and storing the MIP maps of the texture associated with the object being rendered in the local memory of the texture mapping hardware. A MIP map for a texture includes a base map that corresponds directly to the texture map, as well as a series of filtered maps, wherein each successive map is reduced in size by a factor of two in each of the two texture map dimensions. An illustrative example of a set of MIP maps is shown in FIG. 1. The MIP maps include a base map 2 that is eight-by-eight texels in size, as well as a series of maps 4, 6 and 8 that are respectively four-by-four texels, two-by-two texels, and one texel in size.

The four-by-four map 4 is generated by box filtering (downsampling) the base map 2, such that each texel in the map 4 corresponds to an equally weighted average of four texels in the base map 2. For example, the texel 4a in map 4 equals the average of the texels 2a, 2b, 2c, and 2d in map 2, and texels 4b and 4c in map 4 respectively equal the averages of texels 2e–2h and 2i–2l in map 2. The two-by-two map 6 is similarly generated by box filtering map 4, such that texel 6a in map 6 equals the average of texels 4a–4d in map 4. The single texel in map 8 is generated by averaging the four texels in map 6.

Graphics systems generally download, from the main memory of the host computer to the local memory of the texture mapping hardware, the texture mapping data that is to be used with the primitives to be rendered on the display screen. This procedure may entail downloading the complete series of MIP maps for any texture used with the primitives or merely a portion (i.e., block) of the texture mapping data from a single MIP map. The determination of which MIP map in a series of MIP maps to access to provide the appropriate texel data for a particular pixel is based upon the number of texels to which the pixel maps. For example, if the pixel maps in a one-to-one correspondence with a single texel in the texture map, then the base map 2 is accessed. However, if the pixel maps to four, sixteen, or sixty-four texels, then the maps 4, 6 and 8 are respectively accessed because those maps respectively store texel data representing an average of four, sixteen, and sixty-four texels in the texture map.

In order to determine the number of texels to which a pixel maps so that the appropriate MIP map can be accessed, the S and T parameter gradient values (ΔS and ΔT) are calculated. The parameter gradients ΔS, ΔT respectively equal changes in the S and T coordinates between adjacent pixels in both the x and y directions. In essence, the gradients ΔSx, ΔSy, ΔTx, and ΔTy for a display screen pixel indicate the rate of change in coordinate position within the texture map for a change of one pixel on the display screen in the x and y directions in the corresponding S and T dimensions. For example, a gradient equal to two for a display screen pixel indicates that the pixel maps to four texels (i.e., $2^2$ texels as discussed below), so that the MIP map that is reduced by two from the base map (e.g., the map 4 in FIG. 1) should be accessed to provide the resultant texture data for the pixel. Thus, as the gradient increases, the size of the MIP map that is accessed to provide the resultant texture data for the pixel reduces in size.

In conventional texture mapping systems, a single gradient is calculated for each pixel, and typically equals to the largest of ΔSx, ΔSy, ΔTx, and ΔTy. However, it should be understood that the gradient for a pixel can be calculated in a variety of well-known methods, such as by selecting the smallest of those values or an average of those values. The precise gradient can be calculated by first determining ΔS and ΔT in accordance with equation (1) and (2) below:

$$\Delta S = \sqrt{\Delta Sx^2 + \Delta Sy^2} \quad (1)$$

$$\Delta T = \sqrt{\Delta Tx^2 + \Delta Ty^2} \quad (2)$$

The gradient is thence the greater of ΔS and ΔT. In comparison, by merely taking the maximum of ΔSx, ΔSy, ΔTx, and ΔTy, the gradient will be in error by $\sqrt{2}$, which is an acceptable margin of error in most cases. Moreover, since a single gradient (e.g., ΔSx, ΔSy, ΔTx or ΔTy) is selected which only represents the rate of change in one of the S and T coordinates.

Further, a pixel may not map directly to any one texel in the selected map and may fall between two or more texels. In such cases, the values of the S and T coordinates comprise both an integer and fractional portion. Some graphics systems employ bilinear interpolation to accurately produce texel data when this occurs. If a pixel maps into a MIP map between two or more texel entries, then the resulting texel data used is a weighted average of the closest texel entries. Thus, the texel data corresponding to any pixel can be the weighted average of as many as four texel entries in a single map. For example, with reference to FIG. 1, if a pixel maps to a location in map 4 indicated at 4e, the resulting texel data mapping to that pixel would be the weighted average of the texels 4a–4d, where the weighted average is dependent upon the fractional portion of the coordinate S and T.

Pixels may also not map directly into any one of the maps in the series of MIP maps, and may fall between two maps. For example, a pixel may map to a number of texels in the texture map that is greater than one, but less than four. Some graphics systems address this situation by interpolating between the two closest MIP maps to achieve the resultant texel data. With reference to FIG. 1, an example would be where a pixel maps to greater than one, but less than four texels in the texture map. Thus, the texel data provided by maps 2 and 4 would be interpolated to achieve the resultant texel data for the pixel. When combined with the aforementioned interpolation of multiple texel entries in a single map, a scheme known as trilinear interpolation is achieved and can lead to resultant texel data for any one pixel that is generated as a weighted average of as many as eight texels. For instance, the four closest texels in each of the two closest maps are combined as a weighted average of the two maps.

As described above, the process of calculating a gradient is fairly straightforward and requires a minimal amount of hardware to implement. However, it has been recognized that an object rendered on a graphics display screen is inaccurate and will appear unrealistic if perspective correction is not performed on the texture mapping data. Moreover, without perspective correction, artifacts are also generated because the texture data distorts inconsistently from pixel to pixel. For a more detailed explanation of perspective correction and the necessity for such, refer to J. Blinn, "Hyperbolic Interpolation," IEEE Computer Graphics & Applications, pp. 89–94, July 1992.

In general, perspective correction involves performing nonlinear mathematical operations on the primitive data defining the object being rendered so that, for example, the primitives become narrower as they appear farther away in the z direction on the display screen. The nonlinearity is introduced when performing perspective correction makes gradient calculations dramatically more complex, requiring pages of microcode and sophisticated hardware.

Thus, a heretofore unaddressed need exists in the industry for a new or improved system and method for calculating parameter gradients in a texture mapping graphics system that incorporates perspective correction. Specifically, there is a need for a method and system for performing gradient calculations in an expedited manner with minimal hardware requirements in a graphics system where perspective correction is performed.

SUMMARY OF THE INVENTION

An object of the present invention is to overcome the deficiencies and inaccuracies in the prior art as described above and as generally known in the industry.

Another object of the present invention is to improve the accuracy of the displayed images of a texture mapping computer graphics system.

Another object of the present invention is to reduce the hardware requirements for solving gradient calculations in a texture mapping system without sacrificing performance.

Another object of the present invention is to provide a simple process for calculating gradients via plane equations in a texture mapping system that provides perspective correction.

Briefly stated, the present invention is a system and method for performing gradient calculations via plane equations in a texture mapping system. Though plane equations have previously been utilized to generate R,B,G color data values, the present invention utilizes the plane equations in a novel way to calculate the parameter gradients for determining the appropriate MIP map having the texel data for each of the pixels of the displayed image. A plane equation is generated from primitive data provided for each vertex of a triangle primitive and is utilized to interpolate the S and T parameter values. The S and T parameter values are determined by decomposing the primitive into spans which are processed into individual pixels disposed along each span and which represent the triangle primitive. The interpolated parameter values associated with each pixel are then utilized to calculate a gradient for each pixel of the displayed image.

In addition, if perspective correction is performed, the primitive data is modified by a perspective correction factor W before the plane equation defining that primitive is generated. The parameter values for each pixel of the primitive are then interpolated using the plane equation generated from the modified primitive data, and then the correction factor W is removed from the parameter values prior to calculating the gradient.

In an illustrative embodiment of the invention, a system for calculating parameter gradients via plane equations in a texture mapping system comprises the following hardware: a geometry accelerator for computing plane equations from data describing the primitives being rendered; an edge stepper for decomposing the primitive into spans utilizing plane equations, calculating the parameter values for the starting pixel of each span, and calculating a pixel count for each span; a span stepper for calculating the parameter values for each pixel of a span utilizing the parameter values of the starting pixel and the pixel count associated with each span as calculated by the edge stepper; and a gradient mechanism for calculating a gradient for each pixel utilizing the parameter values calculated by the span stepper.

Perspective correction can also be performed by the foregoing system by first having the geometry accelerator divide the primitive data values for each vertex by a corresponding correction factor W prior to generating the plane equations. A correction divider is provided to remove the correction factor W by dividing the parameter values for each pixel by the corresponding 1/W value for that particular pixel prior to the actual calculation of the gradient.

In accordance with another illustrative embodiment, a method is provided for calculating parameter gradients via plane equations in a texture mapping graphics system. This method comprises the steps of: (a) creating a plane equation defining the primitive being rendered; (b) decomposing the primitive into spans utilizing the plane equation and calculating parameter values for the pixel starting of each span; (c) calculating the parameter values of each pixel along each of the spans within the primitive; (d) determining the differences between the parameter values of each pixel and the parameter values for each respective adjacent pixel in an x and y direction; and (e) determining a gradient from the aforementioned differences.

In addition, perspective correction can be incorporated into the aforementioned method by including the following steps: (e) prior to calculating the plane equations in step (a) above, modify the primitive data by a correction factor W; (f) interpolating the reciprocal of the correction factor W to generate a 1/W value for each pixel; and (g) prior to determining the differences in step (d) above, adjusting the parameter values of each pixel by its corresponding 1/W value.

Other objects, features, and advantages of the present invention will become apparent to one with skill in the art from the following description when considered in conjunction with accompanying drawings. All such additional objects, features, and advantages are intended to be included herein within the scope of the present invention, as defined by the claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like reference numerals designate corresponding parts throughout the several views.

DETAILED DESCRIPTION

1. Graphics System Overview

Figure 1:
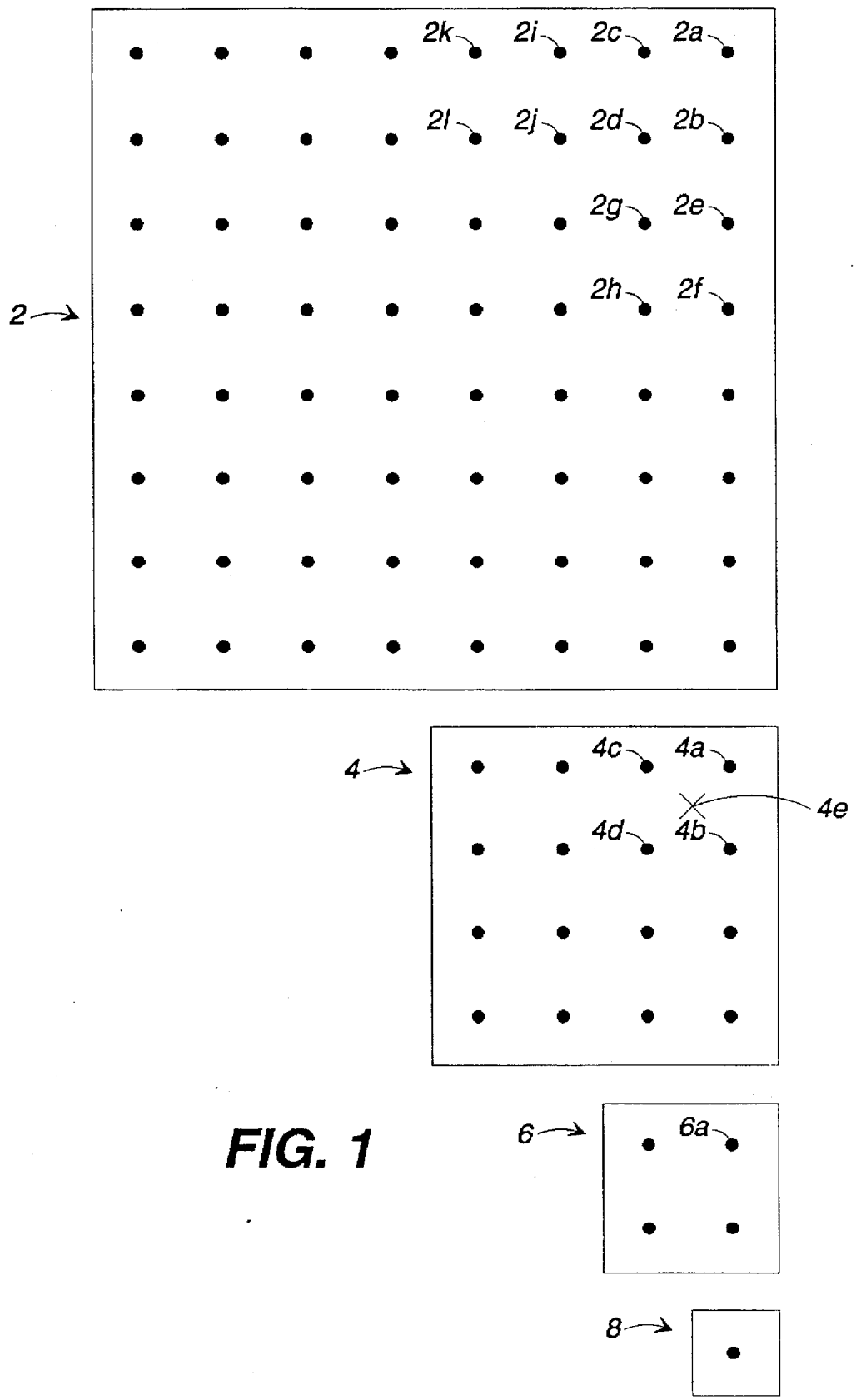
FIG. 1 is a graphical illustration of a series of texture MIP maps.
Figure 2A:
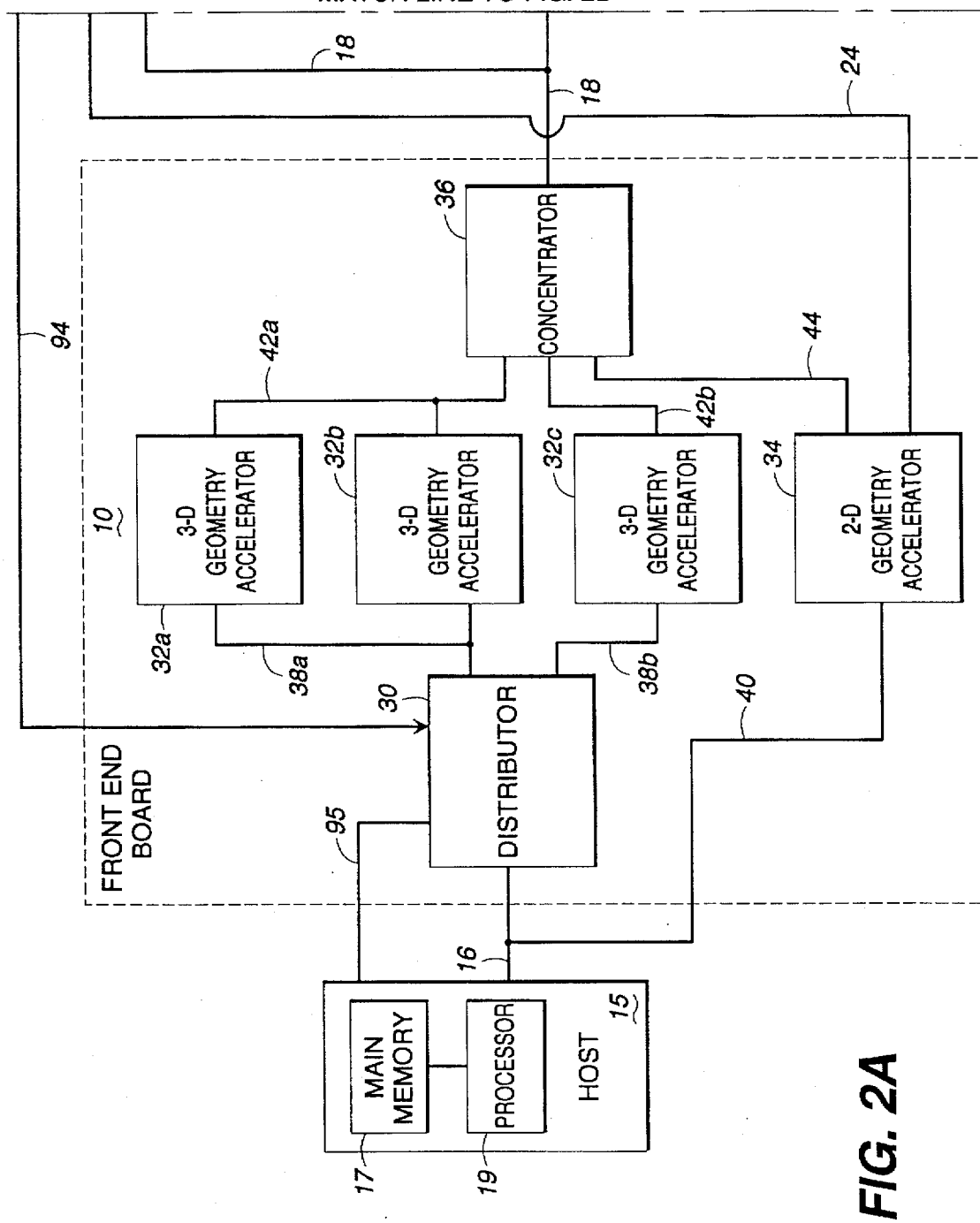
FIGS. 2A–2B are block diagrams of an example of a computer graphics system that implements the present invention.
Figure 2B:
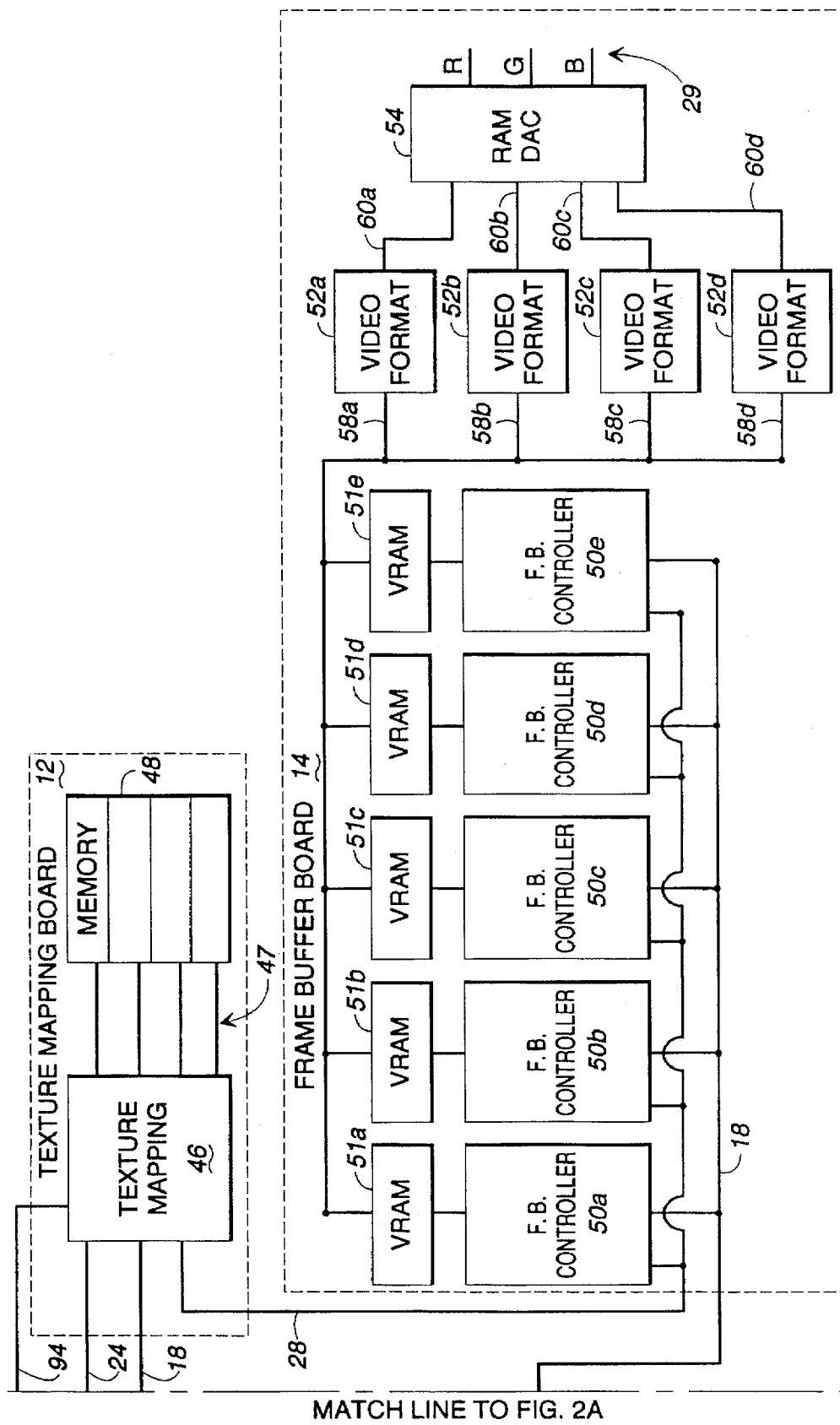

With reference to FIGS. 2A–2B, a block diagram of an illustrative graphics system having the texture mapping hardware for performing gradient calculations in accordance with the present invention is illustrated. It should be understood that the illustrative implementation shown is merely an example of a type of graphics system capable of implementing the present invention, and that numerous other graphics system implementations can be employed. As shown, the system includes a front end board 10, a texture mapping board 12, and a frame buffer board 14. The front end board communicates with a host computer 15 over a 52-bit bus 16. The front end board receives primitives to be rendered from the host computer over the bus 16. The primitives are specified by x,y,z vector coordinate data, R,G,B color data, and texture S,T coordinates, all for potions of the primitives, such as for the vertices when the primitive is a triangle. For purposes of simplifying the discussion and illustrating the present invention, it will be assumed in the following discussion that the primitive is a triangle. The data representing the primitives in three dimensions then is provided by the front end board 10 to the texture mapping board 12 and to the frame buffer board 14 over 85-bit bus 18. The texture mapping board 12 interpolates the primitive data received in order to compute the screen display pixels that will represent the primitive and determines corresponding resultant texture data for each primitive pixel, as discussed in greater detail below. The resultant texture data is provided to the frame buffer board 14 over five 11-bit buses 28, which are shown in FIG. 2 as a single bus to simplify the figure.

The frame buffer board 14 also interpolates the primitive data received from the front end board 10 in order to compute the pixels on the display screen that will represent each primitive, and to determine object color values for each pixel. The frame buffer board 14 then combines, on a pixel-by-pixel basis, the object color values with the resultant texture data provided from the texture mapping board 12, to generate resulting image R,G,B values for each pixel. The R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 are each pipelined and operate on multiple primitives simultaneously. While the texture mapping board 12 and the frame buffer board 14 operate on primitives previously provided by the front end board 10, the front end board 10 continues to operate upon and provide new primitives until the pipelines in the boards 12 and 14 become full.

The front end board 10 includes a distributor mechanism 30, three-dimensional (3-D) geometry accelerator mechanisms 32a, 32b, and 32c, a two-dimensional (2-D) geometry accelerator mechanism 34, and a concentrator mechanism 36. The distributor mechanism 30 receives the x,y,z coordinate and color primitive data over bus 16 from the host computer 15, and distributes 3-D primitive data evenly among the 3-D geometry accelerator mechanisms 32a, 32b, and 32c. In this manner, the system bandwidth is increased because three groups of primitives are operated upon simultaneously. Data is provided over 40-bit bus 38a to the 3-D geometry accelerator mechanisms 32a and 32b, and over 40-bit bus 38b to mechanism 32c. Both buses 38a and 38b transfer data at a rate of about 60 MHZ and provide sufficient bandwidth to support two 3-D geometry accelerator mechanisms. Two-dimensional primitive data is provided over a 44-bit bus 40 to the 2-D geometry accelerator mechanism 34 at a rate of about 40 MHZ.

Each 3-D geometry accelerator mechanism 32a–c transforms the x,y,z coordinates of the vertices that define the triangle primitive received into corresponding screen space coordinates, determines object R,G,B values and texture S,T values for the screen space coordinates, decomposes primitive quadrilaterals into triangles, and computes a triangle plane equation to define each triangle. One plane equation is generated for each triangle by a plane equation mechanism associated with each 3-D geometry accelerator mechanism 32a–c and comprises the following: the parameter values at a starting point (i.e., vertex) of the triangle; the change or slope of each parameter value along each edge of the triangle (i.e., dP/de where P=coordinate values of S and T); the change or slope of each parameter value with respect to changes in the x direction (i.e., dP/dx); and the change or slope of each parameter value with respect to changes in the y direction (i.e., dP/dy).

Figure 3:
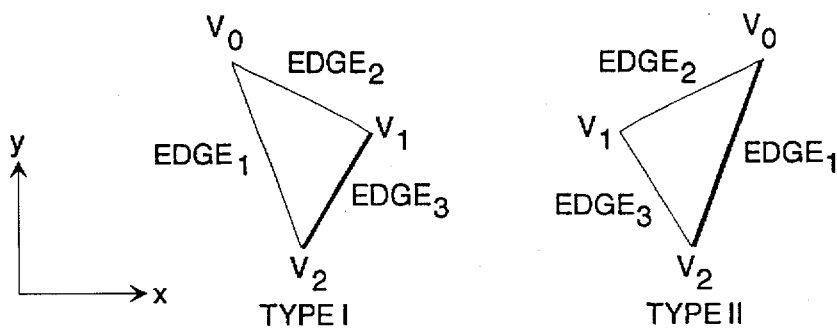
FIG. 3 is a graphical illustration of type I and type II triangles for the generation of plane equations by the computer graphics system of FIG. 2.

Prior to computing the plane equation for each triangle, the triangles are classified as a type I or type II triangle, as illustrated in FIG. 3, and the edges denoted 1, 2, and 3 accordingly, whereby edge 1 is always the tallest edge in the y direction. This is because the rendering hardware steps a triangle from top to bottom, and the spans of a triangle are interpolated either left-to-right (type I triangle) or right-to-left (type II triangle), as discussed in greater detail hereinafter.

In addition, if perspective correction is enabled, as will be assumed for the discussion hereinafter, each 3-D geometry accelerator mechanism 32a–c performs operations on the data associated with the vertices of each triangle primitive prior to the generation of the plane equations. Particularly, the 3-D geometry accelerator mechanism divides each vertex parameter value by a perspective correction factor W defined by a user for each vertex. The plane equation for each triangle is then calculated utilizing the modified parameter values (e.g., S/W and T/W, referred to hereafter as S' and T', therefrom respectively). Further, the 3-D geometry mechanism takes the reciprocal of W (referred to hereafter as W') for each vertex and calculates values for dW'/de, dW'/dx and dW'/dy, and all of which are subsequently sent to the texture mapping board 12 where they are interpolated with the plane equation for the triangle.

Each 3-D geometry accelerator mechanism also performs view clipping operations to ensure an accurate screen display of the resulting image when multiple windows are displayed, or when a portion of a primitive extends beyond the view volume represented on the display screen.

The output data from the 3-D geometry accelerator mechanisms 32a and 32b, and 32c, respectively, is provided over 44-bit buses 42a and 42b, to concentrator mechanism 36 at a rate of about 60 MHZ. Two-dimensional geometry accelerator mechanism 34 also provides output data to concentrator mechanism 36 over a 46-bit bus 44 at a rate of about 45 MHZ. Concentrator mechanism 36 combines the 3-D primitive output data received from the 3-D geometry accelerator mechanisms 32a–c, re-orders the primitives to the original order they had prior to distribution by the distributor mechanism 30, and provides the combined primitive output data over bus 18 to the texture mapping and frame buffer boards.

Texture mapping board 12 includes a texture mapping mechanism 46 and a local memory 48 that is connected to mechanism 46 via bus 47. The memory 48 is preferably arranged as a cache memory formed from a plurality of conventional SDRAM (synchronous dynamic random access memory) mechanisms. The memor 48 stores texture MIP map data associated with the primitives being rendered in the frame buffer board 14. The texture MIP map data is downloaded from a main memory 17 of the host computer 15, over bus 40, through the 2-D geometry accelerator mechanism 34, and over 24-bit bus 24.

The texture mapping mechanism 46 successively receives primitive data over bus 18 representing the primitives to be rendered on the display screen. As discussed above, the data representing the triangle primitives provided from the 3-D geometry accelerator mechanisms 32a–c includes the x,y,z pixel coordinates for at least one vertex, the color R,G,B values of the at least one vertex, the values for S', T' and W' that correspond to the at least one vertex, and the plane equation of the triangle, including adjustments for perspective correction. The texture mapping mechanism 46 ignores the pixel z coordinate and the color R,G,B values.

Figure 4:
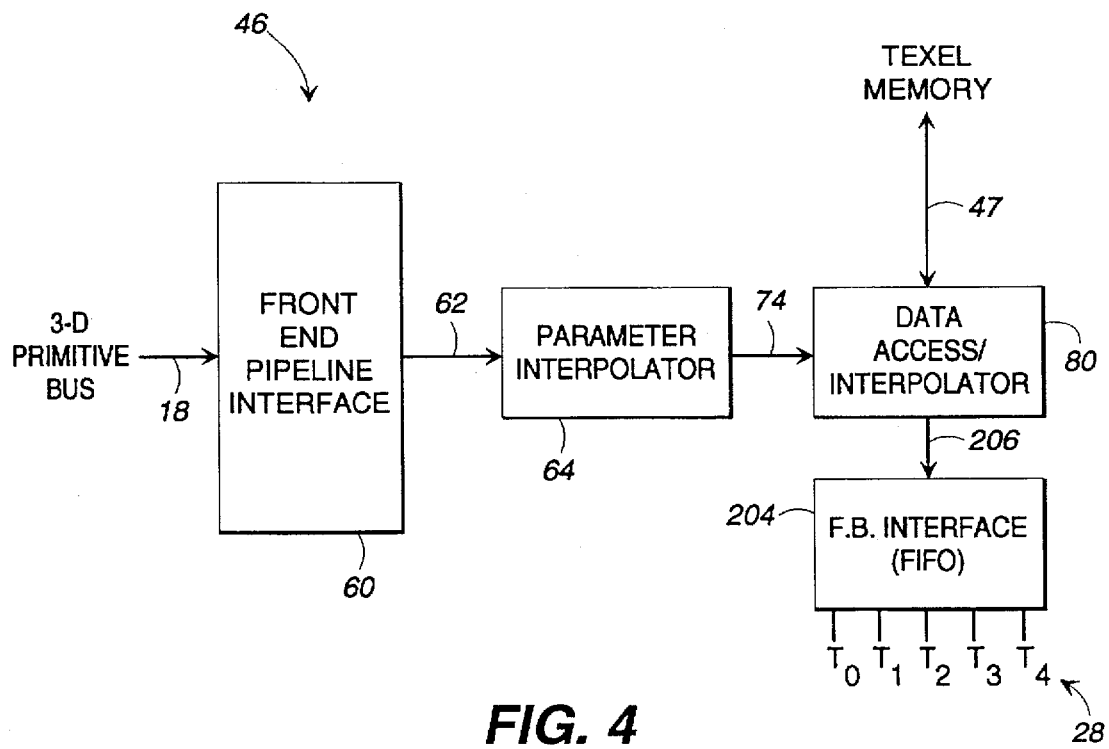
FIG. 4 is a block diagram of the texture mapping hardware the computer graphics system of FIG. 2.

A block diagram of the texture mapping mechanism 46 is shown in FIG. 4. The mechanism 46 includes a front end pipeline interface 60 that receives object and texture primitive data from the 3-D geometry accelerator 32a–c over 64-bit bus 18. The triangle primitives operated upon by the texture mapping mechanism 46 are defined by up to fifty-two 32-bit digital words but can be defined by words of different lengths. The pipeline interface 60 includes a set of master registers and a set of corresponding slave registers. During rendering, the master registers are filled sequentially with the fifty-two digital words of data that define the primitive. Then, upon receipt of an appropriate rendering command, the data is shifted into the slave registers in the pipeline interface, allowing, in a pipeline fashion, the master registers to be filled with data representing another primitive. The primitive data provided over bus 18 includes the x,y,z coordinate data, the S',T' texture coordinates and corresponding W' value, and the R,G,B color data for at least one triangle vertex, as well as data representing a plane equation for each triangle adjusted for perspective correction. As discussed above, the texture mapping mechanism ignores the pixel z coordinate and the color R, G,B values, and stores only the other data in the front end pipeline interface 60.

The slave registers of the pipeline interface 60 transfer the primitive data over bus 62 to a parameter interpolator parameter interpolator mechanism 64.

2. Parameter Interpolation and Gradient Calculation

The parameter interpolator mechanism 64 interpolates each primitive triangle to determine, for each display screen pixel coordinate that represents the triangle, the S and T coordinates for the texture map that maps to the pixel, and an S and T gradient value ($\Delta S$, $\Delta T$).

Figure 5:
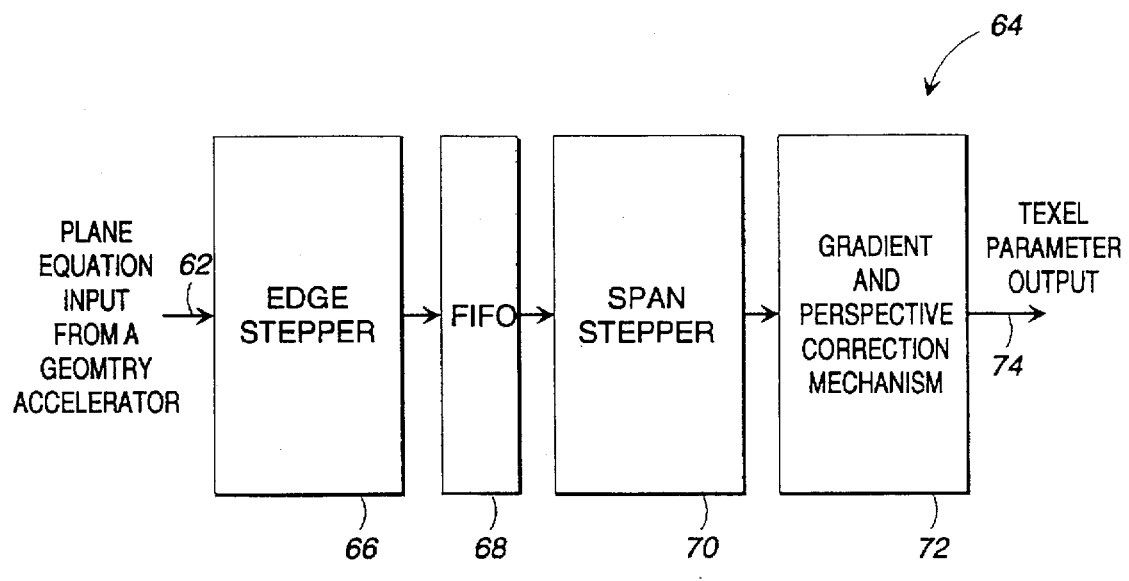
FIG. 5 is a block diagram of the parameter interpolator of the texture mapping hardware of FIG. 4.
Figure 6:
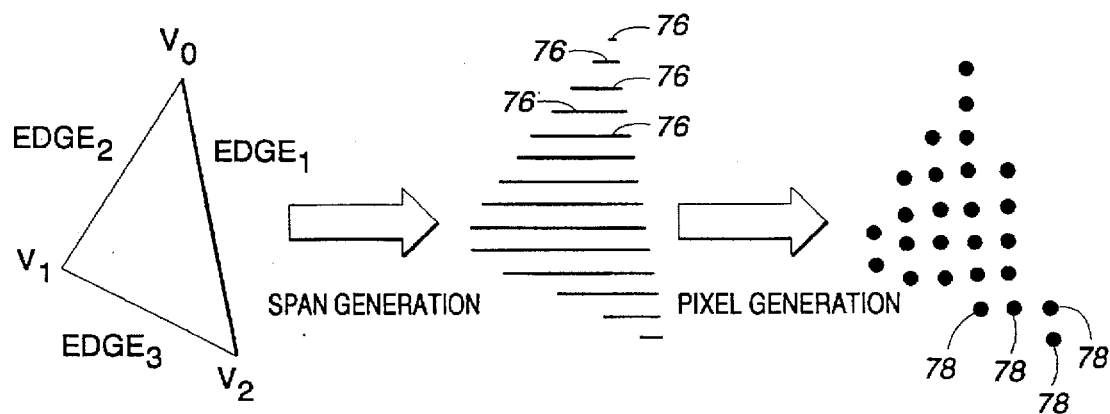
FIG. 6 is a graphical illustration of the decomposition of a triangle primitive into spans and then into pixels as performed by the parameter interpolator of FIGS. 4 and 5.

The parameter interpolator mechanism 64, as shown in more detail in FIG. 5, includes an edge stepper 66, a FIFO ("first-in, first-out") buffer 68, a span stepper 70 and a gradient and perspective correction mechanism 72, all connected in series so as to form sequential pipeline stages. In essence, the edge stepper 66 and span stepper 70 work to decompose each triangle primitive first into horizontal spans 76 that have a constant y value, and then into individual pixels 78 defining the respective triangles, as illustrated in FIG. 6 and described in greater detail below. The gradient and perspective correction mechanism 72 then processes the parameter values associated with each pixel 78 to correct for perspective and to calculate a gradient for each pixel, as also described in greater detail below. The resultant data generated by the parameter interpolar mechanism 64 is then delivered to a data access/interpolator 80 via line 74 for further processing.

In operation, the edge stepper 66 initially receives a plane equation describing a triangle and which it uses to step the edges of the triangle, calculating the location and parameter values for the starting pixel of each horizontal span 76. The edge stepper 66 starts at the x,y pixel coordinate of the top vertex $V_0$ (FIG. 3) and, by utilizing the triangle plane equation, steps the edges of the triangle from top to bottom, two edges at a time, determining the x,y coordinates of a pixel located on edge 1 and a pixel located on edge 2 at opposite ends of a span for each span between edges 1 and 2. When vertex $V_1$ (FIG. 3) is reached, the edge stepper 66 is triggered to step between edges 1 and 3, determining the x,y coordinates of a pixel located on edge 1 and a pixel located on edge 3 at opposite ends of a span for each span between edges 1 and 3. For each pixel coordinate located on edges 1, 2 and 3, the texture map parameter coordinates S', T' and correction factor W' are determined, based on the S', T' and W' values for the vertex $V_0$ and slope of each parameter S', T' and W' (i.e., dP'/de) along edges 1, 2 and 3. The edge stepper 66 further determines the number or count of pixels to be rendered on each span 76. Illustrative of an implementation of the edge stepper 66 is the block diagram of FIG. 7.

Figure 7:
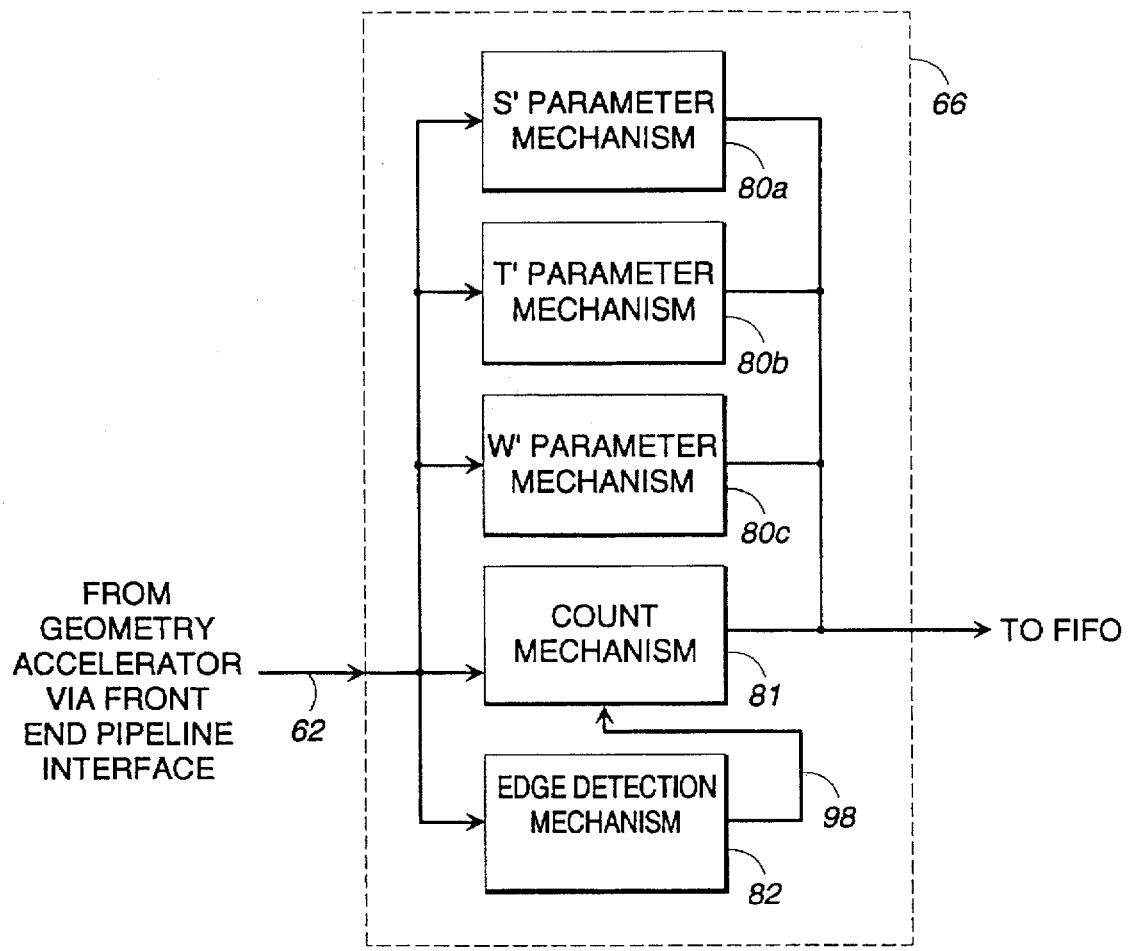
FIG. 7 is a block diagram of the edge stepper of FIG. 5.

With reference to FIG. 7, primite data is received by the edge stepper 66 over line 62 and is distributed to an appropriate parameter mechanism 80a, 80b, and 80c, a count mechanism 81, and an edge detection mechanism 82. The parameter mechanism 80a–80c are provided for each of the parameter S', T', and W', respectively, to interpolate the values of the parameters along edge 1 of the primitive triangle. The count mechanism 81 determines the number or count of pixels to be rendered on each span of the triangle. The edge detection mechanism 82 detects when the vertices $V_2$ and $V_3$ have been reached as the triangle is being stepped from top (at vertex $V_0$) to bottom (at vertex $V_3$) so that the appropriate changes in edge slope between edge 2 and edge 3 can be implemented at vertex $V_2$, as discussed in greater detail below, and so that the stepping will seize at vertex $V_3$.

Each parameter mechanism 80a–c comprises an edge value circuit 83 for calculating the parameter values on edge 1 utilizing the parameter value at vertex $V_0$, the slope value dP'/de of the parameter for edge 1, and the slope value dP'/dx for edge 1 of the parameter.

Figure 8:
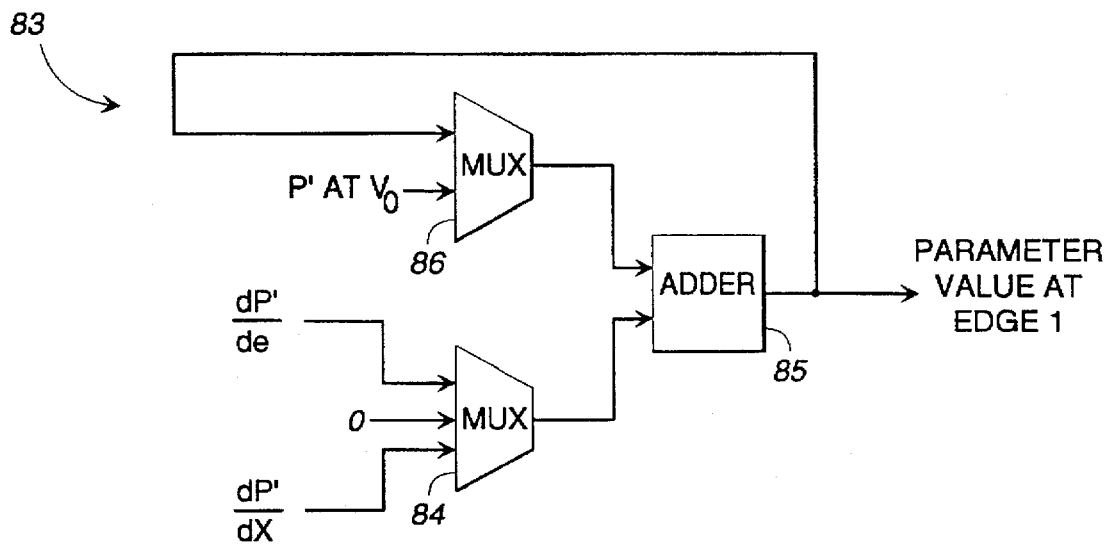
FIG. 8 is a block diagram of an embodiment of an edge value circuit of the parameter mechanism of FIG. 7.

Referring to FIG. 8, an illustrative implementation of an edge value circuit 83 is shown. The edge value circuit 83 includes a multiplexer 84 that receives the values of dP'/de and dP'/dx. In addition a zero value is also provided to the multiplexer 84 for the first parameter value of edge 1, i.e., P' at $V_0$. The output of multiplexer 84 is sent to an adder 85. A second multiplexer 86 is provided that initial outputs the first parameter value on edge 1 (i.e., P' at $V_0$) and then subsequently outputs the previous parameter value for each pixel on edge 1.

In operation, multiplexer 84 first outputs a zero value that is combined at adder 85 with the value of P' at $V_0$ from multiplexer 86. Subsequently, multiplexer 84 outputs to adder 85 the value dP'/de as the triangle is being stepped progressively in the y direction until a change in the parameter value with respect to x is required, at which time the multiplexer 84 outputs the value dP'/dx. Similarly, after initially outputting the value of P' at $V_0$, the multiplexer 86 outputs the previous parameter value on edge 1 which is combined with either dP'/de or dP'/dx at adder 85 to derive the next parameter value along edge 1. Thus, the edge value circuit 83 provides the values of one parameter for each pixel along edge 1 of the triangle.

Figure 9:
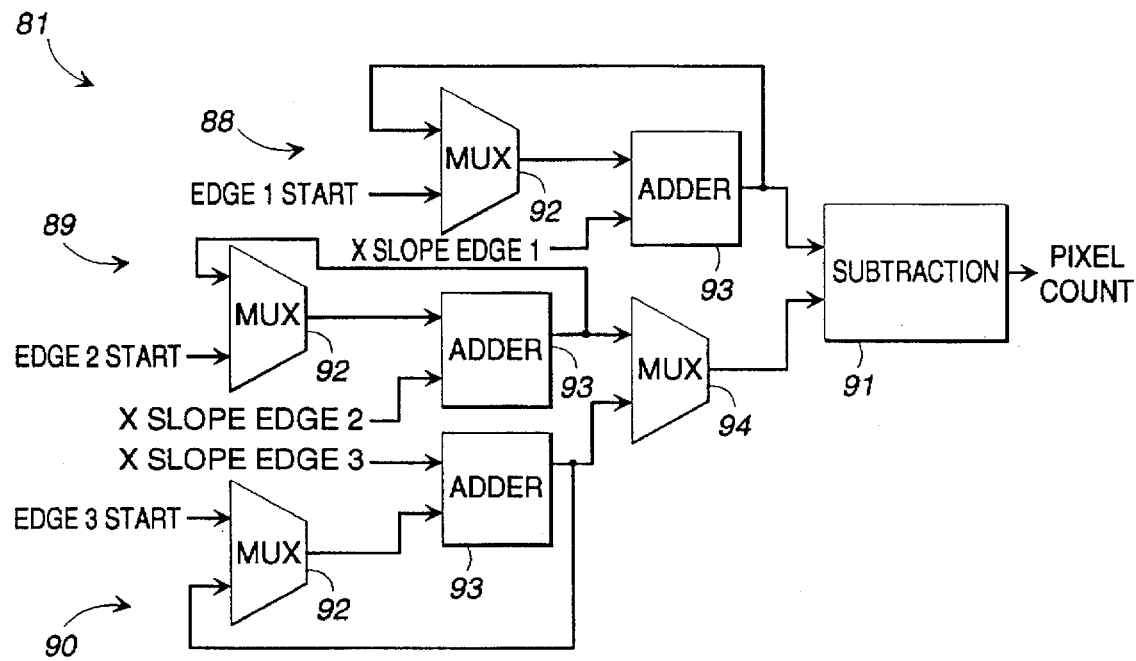
FIG. 9 is a block diagram of the count mechanism of FIG. 7.

Referring now to FIG. 9, an illustrative implementation of the count mechanism 81 is shown. The count mechanism 81 takes the x value on opposite edges of the triangle for a constant y value (i.e., a single span) and subtracts the two x values in order to derive the number or count of pixels on that span which is bordered by the two edges. As can be appreciated with reference to FIG. 3, the edges bordering each of the spans of the triangle will be either edges 1 and 2 or edges 1 and 3. The count mechanism 81 is thus divided into three portions 88, 89, and 90 for determining the respective x value on edges 1, 2, and 3, as the triangle is being stepped from top to bottom. A subtractor 91 is provided to calculate the pixel count by taking the difference between the x values on edges 1 and 2 or edges 1 and 3 for the respective spans of the triangle. Subsequently, the subtractor 91 determines the difference between the x values for each span between edges 1 and 2 beginning at vertex $V_0$ and programming downwardly to vertex $V_2$ and then between edges 1 and 3 from vertex $V_2$ to vertex $V_3$.

Each portion 88, 89, and 91 include a multiplexer 92 that initially outputs the starting x value for the respective edge and then outputs the previous x value for each subsequent pixels on that edge. The output of each multiplexer 92 feeds into an adder 93 that combines the output of the multiplexer 92 with the x slope of the respective edge resulting in the x coordinate location of each pixel along respective edges 1, 2, and 3. The output of respective adders 93 for the portions 89 and 90 is sent to a multiplexer 94. The multiplexer 94 outputs the x values for edge 2 until vertex $V_2$ is reached, at which time it is triggered by the edge detection mechanism 82, as described below, to output the x values of edge 3. Note that the operations of portions 89 and 90 may be combined into a single circuit if desired in order to reduce the hardware requirements of the count mechanism 81. Lastly, the output of multiplexer 94 and the output of adder 93 of portion 88 are sent to the subtractor 91 where the pixel count is calculated for each span by taking the difference of the two values.

Figure 10:
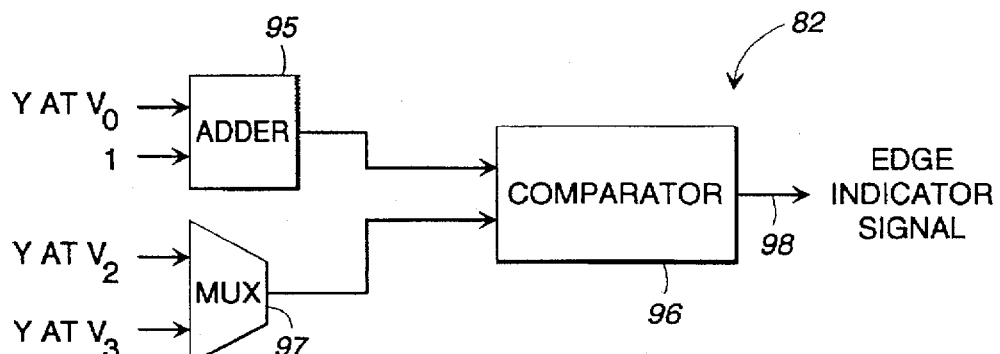
FIG. 10 is a block diagram of the edge detection mechanism of FIG. 7.

Referring now to FIG. 10, an illustrative implementation of the edge detection mechanism 82 is shown. In essence, the edge detection mechanism is configured to trigger the count mechanism 81 when the vertex $V_2$ has been reached, as discussed above, and when vertex $V_3$ has been reached indicating that the complete triangle has been stepped. Beginning with the y value at vertex $V_0$ and incrementing by one at adder 95, the triangle is progressively stepped from vertex $V_0$ to vertex $V_3$. The output of adder 95 represents the y coordinate location of the two pixels associated with each span, i.e., the pixels located on edges 1 and 2 or on edges 1 and 3, as discussed above. A comparator 96 compares the y value outputted by the adder 95 with the output of a multiplexer 97 which initially outputs the y value at vertex $V_2$. Once the output of adder 95 reaches the y value at $V_2$, a signal is sent over line 98 from the edge detection mechanism 82 to the count mechanism 81. In addition, once the y value at vertex $V_2$ is reached, the multiplexer 97 outputs the y value at vertex $V_3$ until that value is reached by the output of adder 95, indicating that the triangle has been completely stepped so as to end the processing of that triangle primitive by edge stepper 66.

The data generated by the edge stepper 66 is temporarily stored in the FIFO buffer 68 before being provided to the span stepper 70 (FIG. 5). The span stepper 70 is responsible for generating pixel parameter values for each pixel which are later passed on to the gradient and perspective correction mechanism 72.

The span stepper 70 begins at each x,y pixel location along an edge of the triangle, and steps across the span 76 to the corresponding pixel location on the opposite edge, stepping either left-to-right or right-to-left, depending on the type of triangle (e.g., type I or type II as illustrated in FIG. 3). Given the location and parameter values for the starting pixel of each span 76, successive pixel parameters S', T' and W' are interpolated by equation (3) below:

$$P_1' = P_0' + dP'/dx \quad (3)$$

where P'=S', T' and W'. For single pixel spans, the span stepper will step one pixel past the end of the span and flag this last pixel so that it will not be rendered. In addition, the last pixel of each span is marked so that the gradient and perspective correction mechanism 72 can reset for the next span. An illustrative implementation of the span stepper 70 is provided in FIG. 11.

Figure 11:
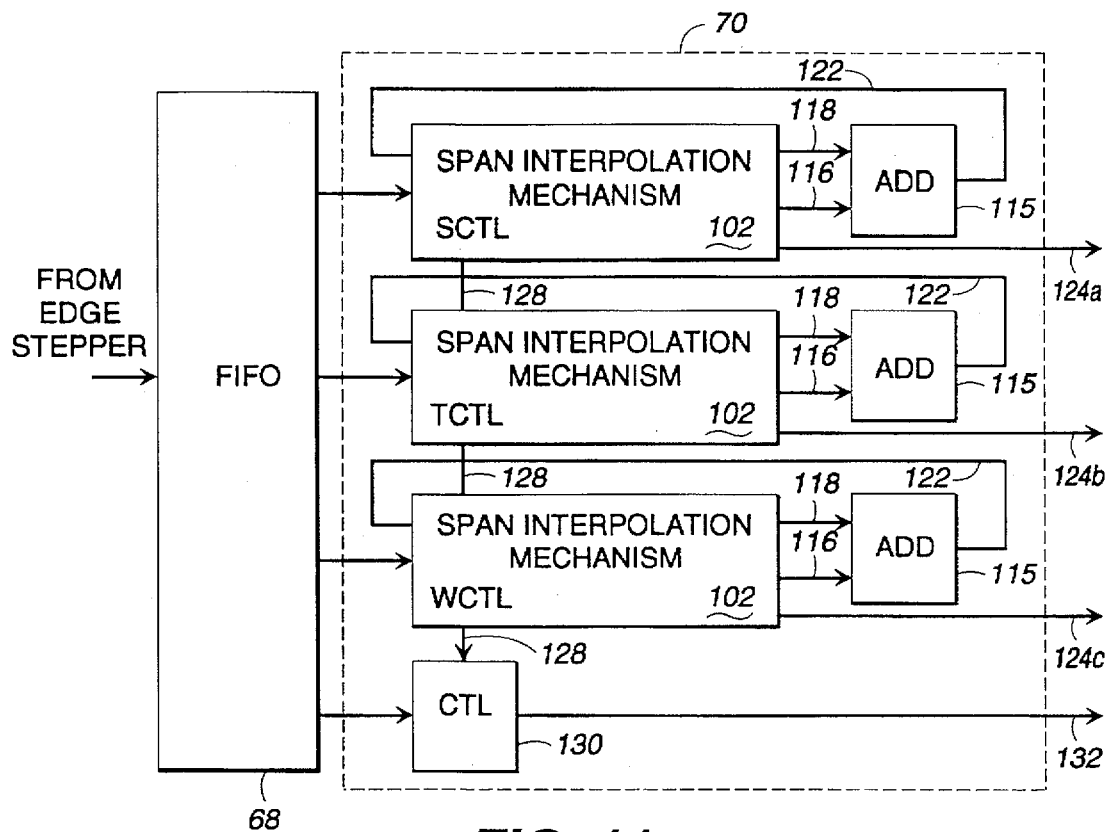
FIG. 11 is a block diagram of the span stepper of FIG. 5.
Figure 12:
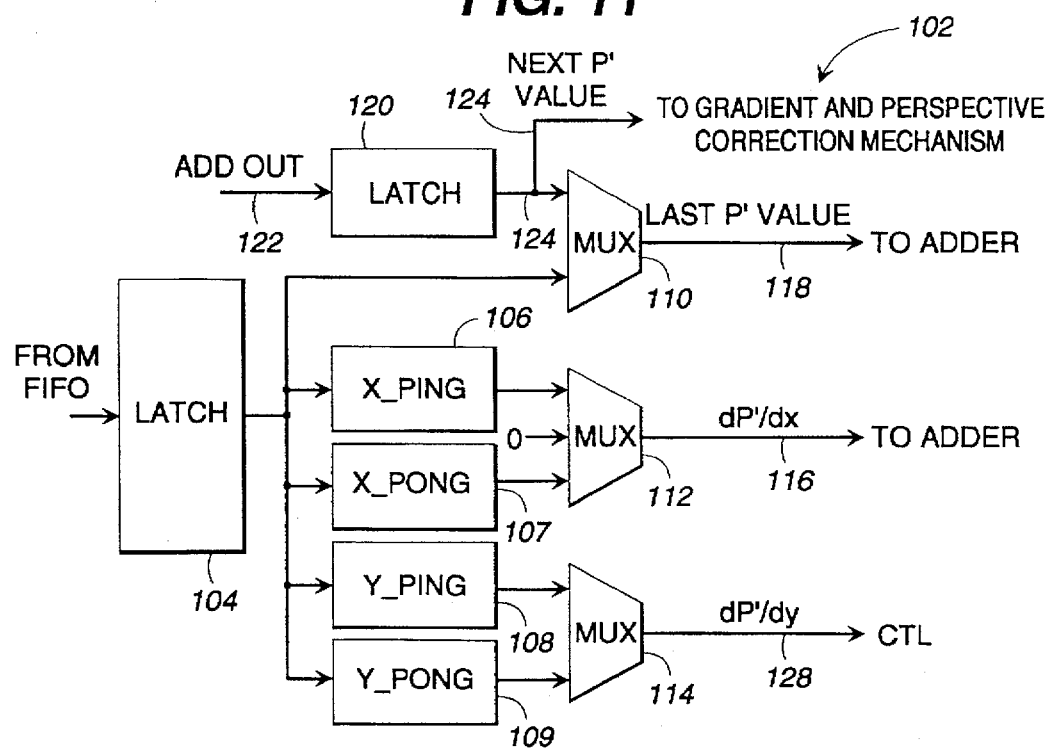
FIG. 12 is a block diagram of an embodiment of a span interpolation mechanism of FIG. 11.

With reference to FIG. 11, data from FIFO 68 is taken one word at a time and delivered to respective span interpolation mechanisms 102 in parallel, one mechanism 102 provided for each parameter S', T', and W'. An illustrative implementation of a span interpolation mechanism 102 is provided in FIG. 12. As shown, a latch 104 latches data from the FIFO into one of an X ping 106 or X pong 107 registers or one of an Y ping 108 or Y pong 109 registers, or alternatively, sent directly to multiplexer 110. The X ping/pong registers 106–107 and Y ping/pong registers 108–109 are buffers for loading dP'/dx and dP'/dy values (i.e., the x and y slope of each parameter S', T' and W') respectively in order to maintain the pipeline operation of parameter interpolator 64. The outputs of X ping/pong registers 106–107 and Y ping/pong registers 108–109 feed respectively into multiplexers 112, 114.

The output of multiplexer 112 is a dP'/dx value which is sent to an adder 115 (FIG. 11) over line 116. Added to the dP'/dx value is the previous parameter value from multiplexer 110, which is provided to the adder 115 over line 118. The output of the adder 115 is sent to a latch 120 via line 122. The value sent over line 122 to latch 120 represents the parameter value at the previous pixel plus the incremental change in the parameter values with respect to x, referred to as dP'/dx, the sum of which is the parameter value of the next pixel in the span. Latch 120 latches the next parameter value to multiplexer 110 and to the gradient and parameter correction mechanism 72 via line 124. Again, at multiplexer 110, the last parameter value is generated over line 118 and sent to adder 115 where dP'/dx is once again added to generate subsequent parameter values. Note that for the parameter values of the first pixel of each span, a zero value is provided at the input of multiplexer 112 so that no slope is added by adder 115.

The output of multiplex 114 is the incremental change in the parameter values with respect to y, referred to as the dP'/dy. This value is sent to the control block 130 via lines 128 from respective span interpolation mechanisms 102, as illustrated in FIG. 11. The control block 130 transfers the y slope value to the gradient and perspective correction mechanism 72 via line 132.

Figure 13:
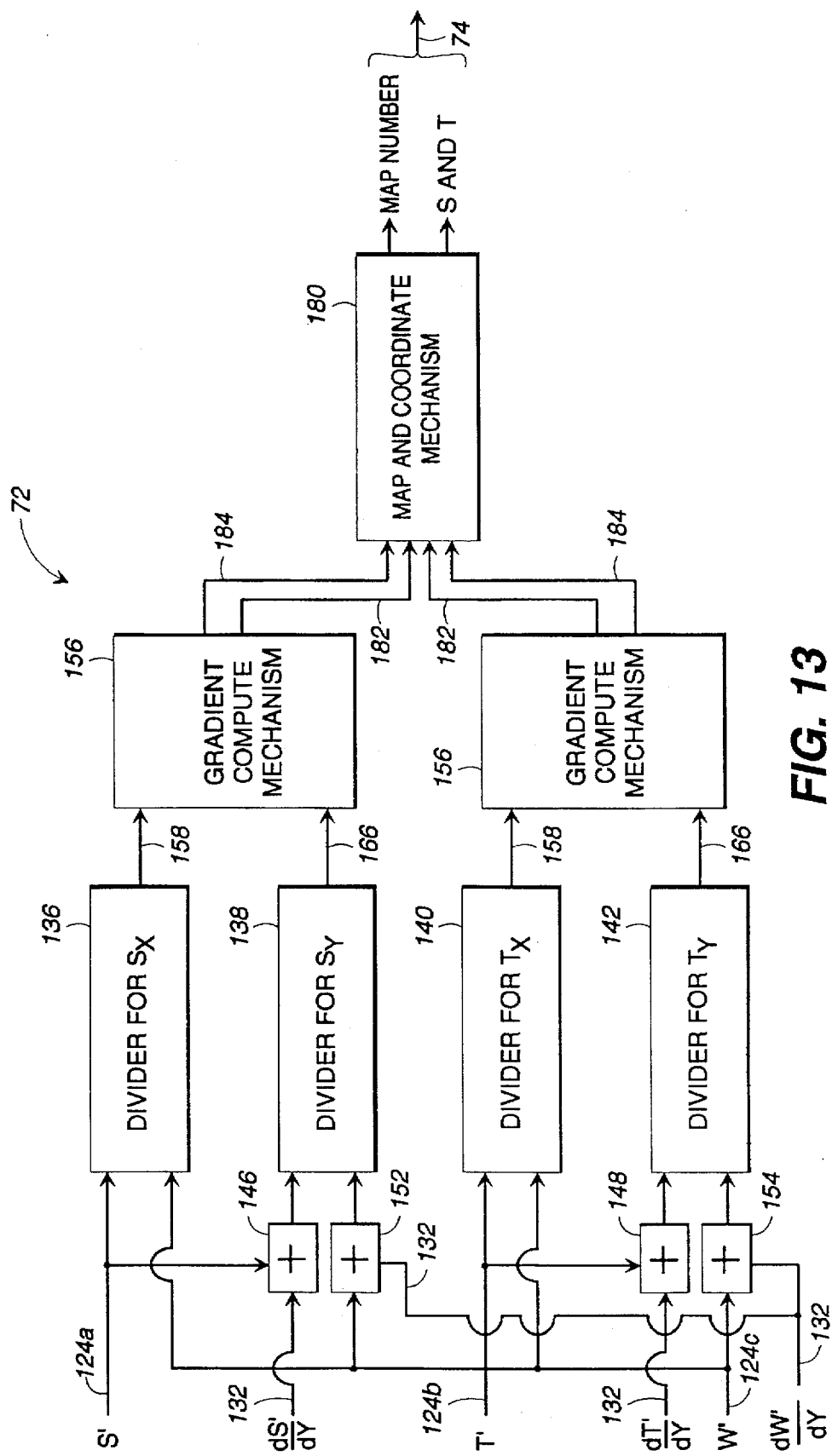
FIG. 13 is a block diagram of the gradient and perspective correction mechanism of FIG. 5.

The gradient and perspective correction mechanism 72, an illustrative embodiment of which is provided in FIG. 13, calculates a gradient for each pixel and completes the perspective correction that began at the 3-D geometry accelerators 32a–32c. The gradient and perspective correction mechanism 72 receives the parameter values S', T', and W' for each pixel via lines 124a, 124b, and 124c from respective span interpolation mechanisms 102 of span stepper 70. The perspective correction is performed first by dividers 136, 138, 140, and 142 that remove the perspective correction factor W. The dividers 136–142 divide the value S' (i.e., S/W), T' (i.e., T/W) by the value W' (i.e., 1/W) in order to remove the perspective correction factor W so that S and T return to the proper coordinate system. Accordingly, the S' and T' values are provided to dividers 136 and 140 via lines 124a, 124b, respectively. In addition, the value W' is also provided directly to dividers 136, 140 via line 124c from the span interpolation mechanism 102 corresponding to W'. Thus, consecutive outputs of dividers 136 and 140, in rasterizing a span, represent the values for the S and T parameters for adjacent pixels in the x direction.

In order to produce the values for the respective parameters S and T in the y direction, dividers 138 and 142 are provided. Inputted respectively into dividers 138, 142 are parameter values of adjacent pixels in the y direction (i.e., the sum of P'+dP'/dy) for S and T via respective adders 146 and 148. In addition, the W value of the adjacent pixel in the y direction (i.e., the sum of W'+dW'/dy) is provided to dividers 138, 142 via respective adders 152, 154. Accordingly, the output of dividers 138 and 142 respectively represent the S and T parameter values for adjacent pixels in the y direction.

A gradient compute mechanism 156 is provided for each parameter to calculate a gradient for each of the parameters in both the x and y directions on a per pixel basis. An illustrative embodiment of the gradient compute mechanism 156 is provided in FIG. 14.

Figure 14:
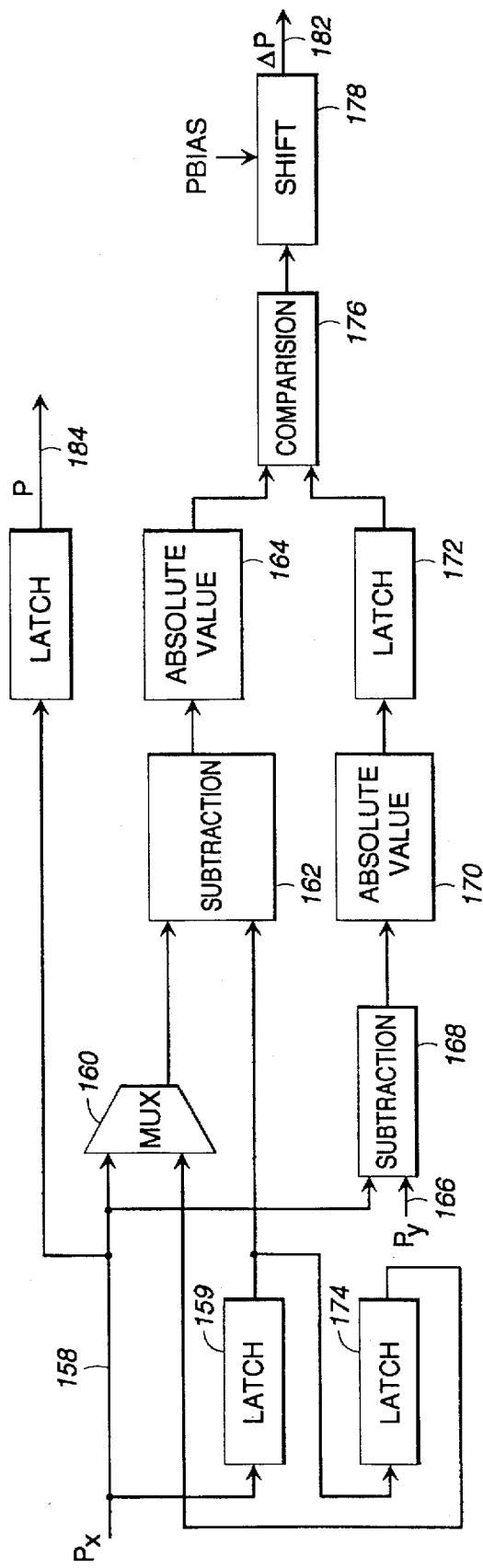
FIG. 14 is a block diagram of an embodiment of the gradient compute mechanism of the gradient and perspective mechanism of FIG. 13.

With reference to FIG. 14, the gradient compute mechanism 156 calculates the gradient by taking the current pixel S and T parameter values and subtracting the corresponding S and T parameter values for the next pixel in the x direction and the adjacent pixel in the y direction resulting in ΔPx and ΔPy respectively for the current pixel. Specifically, the current parameter value provided to the gradient mechanism via line 158 is inputted into multiplexer 160. The same parameter value is latched by latch 159 for comparison with the next pixel value. The current pixel value is subtracted from the previous pixel value by subtractor 162, the absolute value of which is taken at block 164. In addition, the parameter value received on line 158 is subtracted by subtractor 168 from the parameter value of the adjacent pixel in the y direction that is provided to gradient mechanism 156 via line 166. The absolute value of the difference is taken by block 170 and then latched by latch 172 to account for the additional latch 174 so that corresponding pixel values are compared by a comparator 176. Thus, comparator 176 compares ΔPx and ΔPy and outputs the greater referred to hereafter as ΔP.

The resultant gradient Δp is adjusted by P bias (i.e., S bias or T bias) at a shift mechanism 178. The P bias is a user set parameter that allows the user to change the gradient ΔP by a factor of two so that a different MIP map number is generated. The resultant gradient ΔP is provided to a map and coordinate mechanism 180 via line 182. In addition, the parameter values S and T (i.e., P) are also provided to the map and coordinate mechanism 180 via line 184.

The map and coordinate mechanism 180 receives both the gradient values ΔS and ΔT via respective lines 182 and corresponding S and T values via respective lines 184. An illustrative implementation of the map and coordinate mechanism 180 is provided in FIG. 15.

Figure 15:
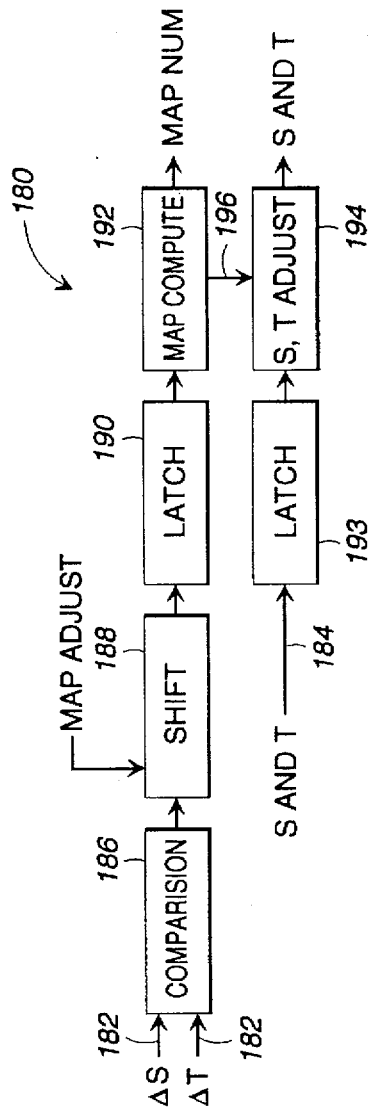
FIG. 15 is a block diagram of an embodiment of the map and coordinate mechanism of FIG. 13.

With reference now to FIG. 15, the gradient values ΔS and ΔT are compared by a comparator 186, the greater of which is adjusted by a predetermined map adjust value set by the user and via a shift register 188. The resultant value is then latched by a latch 190 to a map compute device 192 which calculates the correct MIP map number having the appropriate texture data.

As evident from the present disclosure, the gradient for each pixel calculated by the illustrative mechanism is the maximum of ΔSx, ΔSy, ΔTx, and ΔTy, though, as previously mentioned, numerous other well known methods can be utilized as can be appreciated by one of ordinary skill in the art.

The S and T values received by the map and coordinate mechanism 180 via line 184 are latched by a latch 193 and adjusted by an S, T adjust mechanism 194, utilizing the map number provided by then map compute device 192 via line 196. The S, T adjust mechanism 194 essentially aligns the S and T values to correspond to a particular map within a series of MIP maps as function of the number of MIP maps downsampled. Accordingly, the MIP map number and the S and T values are outputted from the map and coordinate mechanism 180 via line 74 to the data access/interpolator 80 (FIG. 4).

3. Texture Mapping

Referring again to the block diagram of the texture mapping mechanism 46 in FIG. 4, the texel data output from the parameter interpolator mechanism 64 is provided over line 74 to the data access/interpolator 80. The texel data includes the S, T coordinates as well as the MIP map number. The data access/interpolator 80 uses the map number to identify the particular MIP map within the texture's series of maps and the S, T coordinates to locate the appropriate texel data within the MIP map. If the block of texture data (i.e., a portion of a MIP map) containing the texel data is not in the memory 48, the processor 19 of host computer 15 executes the appropriate routines to download the particular map or block of the map from main memory 17 to memory 48 via 2-D geometry accelerator 34. The appropriate texels are then read from memory 48 and interpolated by the data access/interpolator 80 to compute the resultant texture data.

As described above, for each display screen pixel that is reduced with the texture data from a MIP map, as many as four texels from a map (bilinear interpolation) or eight texels from two adjacent maps (trilinear interpolation) may be accessed from the memory 48 to determine the resultant texel data for each pixel.

There are numerous ways in which any number of texels from one or more maps can be combined to generate the resultant texel data. For example, if the display screen pixel maps to a single texel, referred to as point sampling, the resultant texel data equals the single texel that is closest to the location defined by the S, T coordinates in the MIP map defined by the map number. If the display screen pixel maps into four texels, referred to as bilinear sampling, the resultant texel data equals a weighted average of the four closest texels in the MIP where the weighting is based upon how close each respective texel is to the location defined by the S, T coordinates in the MIP map which is defined by the map number. This weighting is based upon a fractional portional of the S and T coordinates.

Alternatively, if the display screen pixel maps to eight texels, referred to as trilinear sampling, the resultant data is determined by taking a weighted average of the four texels in the two closest MIP maps where the weighting is based on the fractional portions of the S and T coordinates. The average value from each of the two closest MIP maps are then combined as a weighted average where the weighting is based upon the value of the gradient. Accordingly, when trilinear sampling is performed, two passes are made by the parameter interpolator 64 in order to generate the two MIP map numbers and the associated S and T coordinate values for each map.

The resultant texel data for the display screen pixels is sequentially provided over bus 202 to a frame buffer interface 204, a FIFO buffer. The outputs T0–T4 of the frame buffer interface 204 are provided to the frame buffer board 14 (FIG. 2) over the five buses 28. As shown at frame buffer board 14, the five buses 28 are respectively coupled to five frame buffer controller mechanisms 50a, 50b, 50c, 50d, and 50e provided on the frame buffer board 14, and provide resultant texture data to the frame buffer controller mechanisms 50a–50e in parallel from texture mapping board 12.

The frame buffer controller mechanisms 50a–50e are respectively coupled to groups of associated VRAM (video random access memory) mechanisms 51a–51e. The frame buffer board further includes four video format mechanisms, 52a, 52b, 52c, and 52d, and a RAMDAC (random access memory digital-to-analog converter) 54. The frame buffer controller mechanisms control 50a–50e different, nonoverlapping segments of the display screen. Each frame buffer controller mechanism receives primitive data from the front end board 10 over bus 18, and resultant texture mapping data from the texture mapping board 12 over bus 28. The frame buffer controller mechanisms 50a–50e interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board 12, the frame buffer controller mechanisms 50a–50e combine, on a pixel-by-pixel basis, the object color values and the resultant texture data to generate final R,G,B values for each pixel to be displayed on the display screen.

The manner in which the texture object and color values are combined can be controlled in a number of different ways. For example, in a replace mode, the object color values can be simply replaced by the texture color values, so that only the texture color values are used in rendering the pixel. Alternatively, in a modulate mode, the object and texture color values can be multiplied together to generate the final R,G,B values for the pixel. Furthermore, a color control word can be stored for each texel that specifies a ratio defining the manner in which the corresponding texture color values are to be combined with the object color values. A resultant color control word can be determined for the resultant texel data corresponding to each pixel and provided to the frame buffer controller mechanisms 50a–50e over bus 28 so that the controller mechanisms can use the ratio specified by the corresponding resultant control word to determine the final R,G,B values for each pixel.

The resulting image video data generated by the frame buffer controller mechanisms 50a–50e, including R,G,B values for each pixel, is stored in the corresponding VRAM mechanisms 51a–51e. Each group of VRAM mechanisms 51a–51e includes eight VRAM mechanisms, such that forty VRAM mechanisms are located on the frame buffer board 14. Each of video format mechanisms 52a–52d is connected to, and receives data from, a different set of ten VRAM mechanisms. The video data is serially shifted out of the VRAM mechanisms and is respectively provided over 64-bit buses 58a, 58b, 58c, and 58d to the four video format mechanisms 52a, 52b, 52c, and 52d at a rate of about 33 MHZ. The video format mechanisms 52a–52d format the video data so that it can be handled by the RAMDAC 54 and provide the formatted data over 32-bit buses 60a, 60b, 60c, and 60d to RAMDAC 54 at a rate of about 33 MHZ. The RAMDAC 54, in turn, converts the digital color data to analog R,G,B color control signals and provides the R,G,B control signals for each pixel to a screen display (not shown) along R,G,B control lines 29.

In concluding the detailed description, it should be noted that it will be obvious to those skilled in the art that many variations and modifications may be made to the preferred embodiment without substantially departing from the principles of the current invention. All such variations and modifications are intended to be included herein within the scope of the present invention, as set forth in the following claims. Further, in the claims hereafter, the structures, materials, acts, and equivalence of all means or step plus function elements are intended to include any structures, materials, or acts for performing the functions.

Wherefore, the following is claimed:

1. A gradient calculation system for use in a graphics system wherein texture and color data are generated and combined for each pixel of an image being rendered, comprising:

a plane equation mechanism that generates a plane equation from data describing a primitive of said image being rendered;

an edge stepper that determines a location and associated texel coordinate values for each pixel on an edge of said primitive utilizing said plane equation, and for determining a pixel count for each span defining said primitive;

a span stepper that determines texel coordinate values for each pixel located on each said span utilizing said locations, texel coordinate values, and said pixel counts determined by said edge stepper; and a gradient mechanism that determines a gradient for each said pixel located on each said span utilizing said texel coordinate values determined by said span stepper;

wherein said edge stepper, said span stepper and said gradient mechanism are pipelined.

2. The system of claim 1, wherein said edge stepper includes a parameter mechanism that determines said texel coordinate values for each said pixel, a count mechanism that determines said pixel count for each said span, and an edge detection mechanism that detects vertices of said primitive.

3. The system of claim 1, wherein said gradient mechanism determines a first set of differences between said texel coordinate values for a current pixel and said texel coordinate values of an adjacent pixel in the x direction, and a second set of differences between said texel coordinate values for said current pixel and an adjacent pixel in the y direction, and then takes a maximum difference from said first and second sets of differences as said gradient.

4. The system of claim 1, wherein said edge stepper, said span stepper and said gradient mechanism are integrated into a texture mapping mechanism, and wherein said graphics system comprises:

a processor that controls processing of said texture and color data for each pixel of said image, said processor in communication with said texture mapping mechanism;

a memory in communication with said processor and said texture mapping mechanism for storing texel data; and a data access interpolator that utilizes said gradients and said coordinate values generated by said texture mapping mechanisms to locate appropriate texel data values in said memory and to interpolate a texel value for each pixel of said image from said texel data values for combining with said color data.

5. The system of claim 1, further including perspective correction means for performing perspective correction on said texel coordinate values.

6. The system of claim 5, wherein said perspective correction means modifies said data describing said primitive with a weighting factor prior to said plane equation generation by said plane equation mechanism and removes said weighting factor prior to the determination of said gradients by said gradient mechanism.

7. A gradient calculation system for use in a texture mapping system, comprising:

(a) first means for generating a plane equation from primitive data describing a primitive to be rendered;

(b) second means for decomposing said primitive defined by said plane equation into pixels which define said primitive, each said pixel having corresponding parameter values; and (c) third means for determining a gradient from said parameter values;

wherein said first means, said second means, and said third means are pipelined.

8. The system of claim 7, wherein said first means comprises a geometric accelerator.

9. The system of claim 7, further comprising a fourth means for performing perspective correction on said primitive being rendered by said system.

10. The system of claim 7, wherein said parameter values include MIP map coordinate values and a perspective correction weighting factor.

11. The system of claim 7, wherein said third means includes a gradient mechanism that determines a first set of differences between said parameter values for a current pixel and said parameter values of an adjacent pixel in the x direction and a second set of differences between said parameter values for said current pixel and an adjacent pixel in the y direction, and then takes a maximum difference from said first and second sets of differences as said gradient.

12. The system of claim 7, wherein said second means includes an edge stepper and a span stepper.

13. The system of claim 12, wherein said edge stepper has a means for calculating said parameter values for each pixels along an edge of said primitive utilizing said plane equation so as to generate starting parameter values for a span.

14. The system of claim 12, wherein said span stepper has a means for interpolating said parameter values for each pixel along a span utilizing one or more starting parameter values.

15. A method for calculating a gradient in a texture mapping system from a plane equation describing a primitive, comprising the steps of:

generating said plane equation describing said primitive;

determining a location and parameter values for each pixel on an edge of said primitive utilizing said plane equations, including parameter values of a starting pixel for each span of said primitive;

(c) calculating parameter values for each pixel along each one of said spans utilizing said parameter values of said starting pixel for each span;

(d) determining a first set of differences between said parameter values for a current pixel and said parameter values of a next pixel in the x direction along said span and a second set of differences between said parameter values for said current pixel and next pixel in the y direction; and (e) calculating a gradient from said first and second sets of differences.

16. The method of claim 15, further comprising the step of performing perspective correction.

17. The method of claim 15, wherein said step of calculating a gradient comprises taking a maximum difference of said first and second sets of differences determined in step (d).

18. The method of claim 16, wherein said parameter values include MIP map coordinate values and a perspective correction weighting factor.

* * * * *